United States Patent
Trzmiel (10) Patent No.: US 10,436,243 B2
(45) Date of Patent: Oct. 8, 2019

(54) CRANK SHAFT FOR AN INLINE INTERNAL COMBUSTION ENGINE AND AN INLINE INTERNAL COMBUSTION ENGINE

(71) Applicant: PROMESCON GMBH, Nuertingen (DE)

(72) Inventor: Alfred Trzmiel, Nuertingen (DE)

(73) Assignee: PROMESCON GMBH, Nuertingen (DE)

( * ) Notice: Subject to any disclaimer, the term of this patent is extended or adjusted under 35 U.S.C. 154(b) by 0 days.

(21) Appl. No.: 15/556,616

(22) PCT Filed: Mar. 11, 2015

(86) PCT No.: PCT/EP2015/055081
§ 371 (c)(1),
(2) Date: Sep. 8, 2017

(87) PCT Pub. No.: WO2016/141986
PCT Pub. Date: Sep. 15, 2016

(65) Prior Publication Data
US 2018/0106290 A1    Apr. 19, 2018

(51) Int. Cl.
   *F01L 1/34*    (2006.01)
   *F16C 3/20*    (2006.01)
   *F16F 15/28*   (2006.01)

(52) U.S. Cl.
   CPC .............. *F16C 3/20* (2013.01); *F16F 15/283* (2013.01)

(58) Field of Classification Search
   CPC ................................. F16C 3/20; F16F 15/283

USPC ....................................................... 123/192.2
   See application file for complete search history.

(56) References Cited

U.S. PATENT DOCUMENTS

| | | | | |
|---|---|---|---|---|
| 1,592,237 A | * | 7/1926 | Walker | F16F 15/24 |
| | | | | 123/192.2 |
| 3,835,728 A | | 9/1974 | Bernard | |
| 4,249,374 A | * | 2/1981 | Sugasawa | F02D 17/02 |
| | | | | 123/198 F |
| 4,556,026 A | * | 12/1985 | Masuda | F01L 13/00 |
| | | | | 123/192.2 |

(Continued)

FOREIGN PATENT DOCUMENTS

| | | |
|---|---|---|
| CH | 297 119 A | 3/1954 |
| CN | 1875180 A | 12/2006 |

(Continued)

*Primary Examiner* — Marguerite J McMahon
(74) *Attorney, Agent, or Firm* — Norman B. Thot (57) ABSTRACT

A crankshaft for an in-line internal combustion engine includes at least two bearing points, and crank throws which include a first and a last crank throw. Each of the crank throws includes a counter-weight element. The first and the last crank throw each additionally include an additional weight. The crank throws are arranged angularly offset with respect to each other so that at least two of the crank throws are arranged in angular coincidence with each other. The crank throws and their respective counter-weight elements are arranged to provide for a mass balance. The first and the last crank throw, as seen in an axial direction of the crankshaft, are arranged in angular coincidence with each other. The additional weight of the first and the last crank throw are arranged in a mirrored manner, as seen in the axial direction of the crankshaft.

12 Claims, 6 Drawing Sheets

(56) References Cited

U.S. PATENT DOCUMENTS

| | | | | |
|---|---|---|---|---|
| 8,757,027 B2* | 6/2014 | Williams | ............ | F16C 3/20 |
| | | | | 123/192.2 |
| 2013/0245921 A1* | 9/2013 | Glugla | ............ | F02D 41/0085 |
| | | | | 701/105 |
| 2014/0041617 A1* | 2/2014 | Williams | ............ | F16C 3/20 |
| | | | | 123/192.2 |
| 2014/0102429 A1* | 4/2014 | Hayman | ............ | F02M 35/10222 |
| | | | | 123/568.18 |
| 2014/0283783 A1 | 9/2014 | Hayman et al. | | |

FOREIGN PATENT DOCUMENTS

| | | |
|---|---|---|
| CN | 103726958 A | 4/2014 |
| CN | 104061073 A | 9/2014 |
| CN | 204061515 U | 12/2014 |
| DE | 2 333 998 A1 | 1/1974 |
| DE | 31 51 091 A1 | 6/1982 |
| DE | 10 2011 054 881 B3 | 3/2013 |
| GB | 2 092 235 A | 8/1982 |
| JP | S49-85446 A | 8/1974 |
| JP | 59-113313 A | 6/1984 |
| JP | H02-97744 A | 4/1990 |
| JP | H05-306633 | 11/1993 |
| JP | H08-285015 A | 11/1996 |

* cited by examiner

CRANK SHAFT FOR AN INLINE INTERNAL COMBUSTION ENGINE AND AN INLINE INTERNAL COMBUSTION ENGINE

CROSS REFERENCE TO PRIOR APPLICATIONS

This application is a U.S. National Phase application under 35 U.S.C. § 371 of International Application No. PCT/EP2015/055081, filed on Mar. 11, 2015. The International Application was published in German on Sep. 15, 2016 as WO 2016/141986 A1 under PCT Article 21(2).

FIELD

The present invention relates to a crankshaft for an in-line internal combustion engine with at least two bearing points and a number of crank throws, wherein the crank throws are arranged angularly offset with respect to each other so that two crank throws are provided in angular coincidence with each other, and wherein the crank throws are associated with counter-weight elements for mass balance. The present invention also relates to an in-line internal combustion engine with a crankcase and a crankshaft received therein and having a number of crank throws, as well as with a cylinder housing having a corresponding number of cylinders, wherein the cylinder housing is connected to a cylinder head in which inlet and outlet valves are provided, as well as at least one camshaft for the inlet valves and at least one camshaft for the outlet valves.

BACKGROUND

Such a crankshaft or such an in-line internal combustion engine was previously described in DE 10 2011 054 881. It is thereby basically possible to operate a four cylinder internal combustion engine using a three cylinder ignition sequence, wherein the second and third cylinders run in parallel with each other and one of the two cylinders may be deactivated, if necessary, to save fuel and reduce emissions. Both cylinders may also be operated simultaneously, in particular in low rotational speed ranges, whereby the exhaust gas mass flow of two cylinders is guided to the exhaust gas turbo charger and the turbine can thus be accelerated to very high turbine speeds even at low engine speeds, which results in a high torque. An in-line engine operated in this manner has the disadvantage, however, that free mass moments are generated that cause negative vibration behavior and thereby also result in increased dynamic stress on the engine block and to a negative acoustic behavior inside the vehicle.

SUMMARY

An aspect of the present invention is to provide a crankshaft for a four cylinder internal combustion engine or an in-line combustion engine, which avoids the above disadvantages in a simple and economic manner.

In an embodiment, the present invention provides a crankshaft for an in-line internal combustion engine which includes at least two bearing points and a plurality of crank throws comprising a first crank throw and a last crank throw. Each of the plurality of crank throws comprise a counter-weight element. The first crank throw and the last crank throw each additionally comprise an additional weight. The plurality of crank throws are arranged angularly offset with respect to each other so that at least two of the plurality of crank throws are arranged in angular coincidence with each other. The plurality of crank throws and their respective counter-weight elements are arranged to provide for a mass balance. The first crank throw and the last crank throw, as seen in an axial direction of the crankshaft, are arranged in angular coincidence with each other. The additional weight of the first crank throw and the last crank throw are arranged in a mirrored manner, as seen in the axial direction of the crankshaft.

BRIEF DESCRIPTION OF THE DRAWINGS

The present invention is described in greater detail below on the basis of embodiments and of the drawings in which.

DETAILED DESCRIPTION

In an embodiment, the present invention provides a crankshaft, wherein the first and the last crank throw, seen in the axial direction of the crankshaft, are provided in angular coincidence with each other, wherein the counter-weight elements of the first and the last crank throw have additional weights arranged in a mirrored manner, as seen in the axial direction. The parallel arrangement of the first and last crank throws alone largely reduces the free mass moments of the first order. The tendency to vibrate can be suppressed even further by attaching further additional weights on the first and last crank throws. A negative acoustic behavior can thus be excluded. The cylinder head screws moreover do not need to be designed differently in order to correspond to higher ignition pressure loads.

In an embodiment of a crankshaft of the present invention which is advantageous for a four cylinder internal combustion engine, a first and a second crank throw can, for example, be offset with respect to each other by an angle $\alpha$=approximately 120°, and the second and third crank throws can, for example, be offset with respect to each other by an angle $\beta$=approximately 120°, while the third and fourth crank throws can, for example, be offset with respect to each other by an angle $\gamma$=approximately 120°.

In an embodiment of a crankshaft of the present invention which is advantageous for a six cylinder internal combustion engine, a first and a second crank throw can, for example, be offset with respect to each other by an angle $\alpha'$=approximately 240°, and the second and third crank throws can, for example, be offset with respect to each other by an angle $\beta'$=approximately 240°, while the third and fourth crank throws can, for example, be offset with respect to each other by an angle $\gamma'$=approximately 360°, and the fourth and fifth crank throws can, for example, be offset with respect to each other by an angle δ'=approximately 120°, while the fifth and sixth crank throws can, for example, be offset with respect to each other by an angle ɛ'=approximately 120°.

In an embodiment of a crankshaft of the present invention which is advantageous for a six cylinder internal combustion engine, a first and a second crank throw can, for example, be offset with respect to each other by an angle α"=approximately 60°, and the second and third crank throws can, for example, be offset with respect to each other by an angle β"=approximately 240°, while the third and fourth crank throws can, for example, be offset with respect to each other by an angle γ"=approximately 180°, and the fourth and fifth crank throws can, for example, be offset with respect to each other by an angle δ"=approximately 120°, while the fifth and sixth crank throws can, for example, be offset with respect to each other by an angle ɛ"=approximately 120°.

The present invention further provides an in-line internal combustion engine with four cylinders, wherein an ignition sequence in the cylinders is in the following order of the cylinders: first cylinder, second cylinder, third cylinder, fourth cylinder.

Both the crankshaft and the in-line internal combustion engine including the crankshaft make it possible to operate a four-cylinder in-line internal combustion engine so that a sufficiently long outlet valve control time can be provided for each individual cylinder without a negative vibration behavior occurring both under dynamic and acoustic aspects. The internal exhaust gas recirculation, the charge exchange losses, and the fuel consumption can thereby be significantly optimized. It is important to reduce the exhaust losses and the quantity of the internally recirculated residual gas to optimize the combustion process in particular in the event of a load increase. Due to the increased mass flow ejection of exhaust gas during the exhaust gas outlet cycle of the cylinders associated with the first and fourth crank throws of the crankshaft, the turbo charger receives a torque impulse that leads to a further improvement of the efficiency of the internal combustion engine.

It is also possible to use the crankshaft of the present invention to operate a six-cylinder in-line internal combustion engine with the angular distances α', β', γ', δ', ɛ' or α", β", γ", δ", ɛ" of the crank throws, wherein an ignition sequence in the cylinders is in the following order of the cylinders: first cylinder, second cylinder, fourth cylinder, sixth cylinder, fifth cylinder, third cylinder. The internal combustion engine can thereby be operated with a regular or an irregular ignition sequence depending on the configuration.

A variable valve drive device can also advantageously be provided in the cylinder head. It is also advantageous to provide for a deactivation of the cylinder which is operatively connected to the first or the last crank throw in the lower load range. It is thereby possible to operate the in-line internal combustion engine in the low load range in a most simple manner as a pure three- or five-cylinder internal combustion engine with three or five strokes of the same cylinder capacity.

It may also be particularly advantageous in this context if the variable valve device has an eccentric member which causes a zero stroke of at least the inlet valves of the cylinder to be deactivated in at least one position. It is of course also possible to provide an eccentric member that causes a zero stroke of the outlet valves.

The present invention will be explained in more detail below under reference to the drawings.

Figure 1:
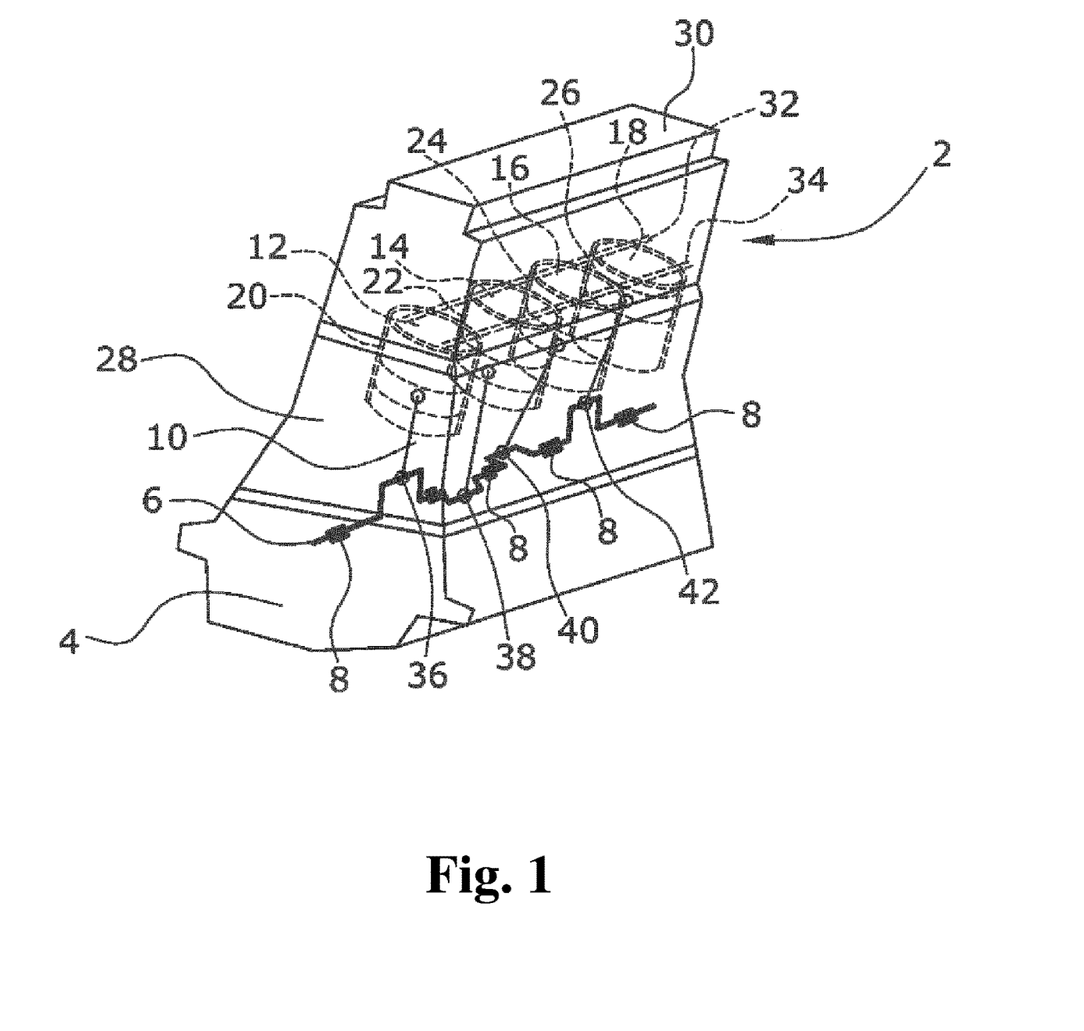
FIG. 1 shows a schematic perspective view of a four-cylinder in-line internal combustion engine with a crankshaft of the present invention.
Figure 3:
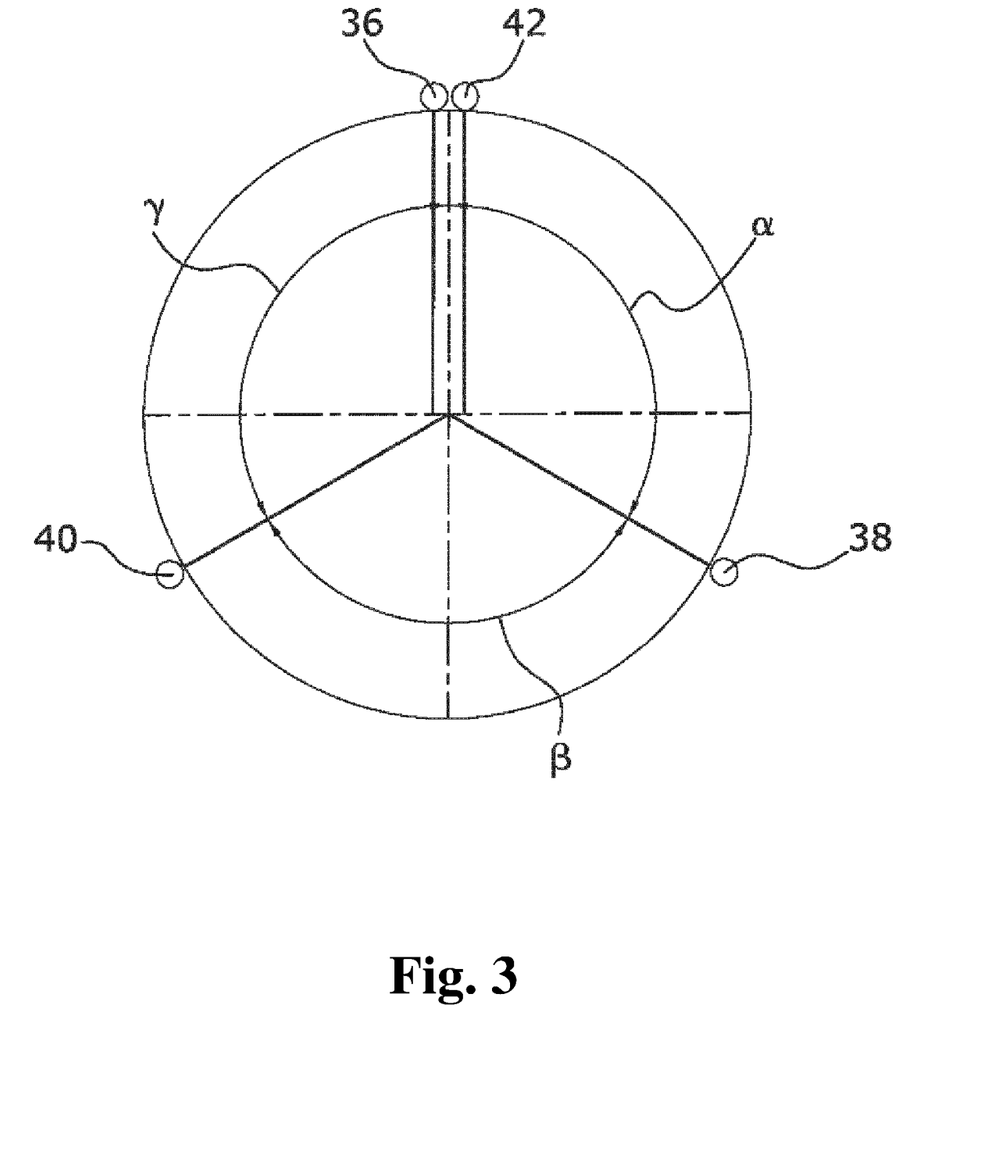
FIG. 3 shows a schematic view of a crank spider of the crankshaft of the present invention shown in FIG. 1.

FIG. 1 schematically shows a perspective view of an in-line internal combustion engine 2 operated as a four-cylinder in-line engine using a four-stroke process. It should be noted that the description of the relative angular orientation of the crank throws is based on a projection (see FIGS. 3 to 5) in a plane. The four-cylinder in-line internal combustion engine 2 substantially comprises a crankcase 4 in which a crankshaft 6 is rotatably supported at five bearing points 8. The crankshaft 6 is connected to pistons 12, 14, 16, 18 via connecting rods 10, which pistons 12, 14, 16, 18 are adapted to be moved up and down in respective cylinders 10, 22, 24, 26 in a manner known per se. The four cylinders 20, 22, 24, 26 are arranged in a cylinder housing 28. The cylinder housing 28 is closed by a cylinder head 30 in which inlet and outlet valves (which are not illustrated in detail) for the four cylinders 20, 22, 24, 26 are arranged in a manner known per se. Two camshafts 32, 24 are also shown schematically, the camshafts 32, 24 acting on the inlet and outlet valves.

The crankshaft 6 has crank throws 36, 38, 40, 42 connected to the connecting rods 10 in a manner known per se.

Figure 6:
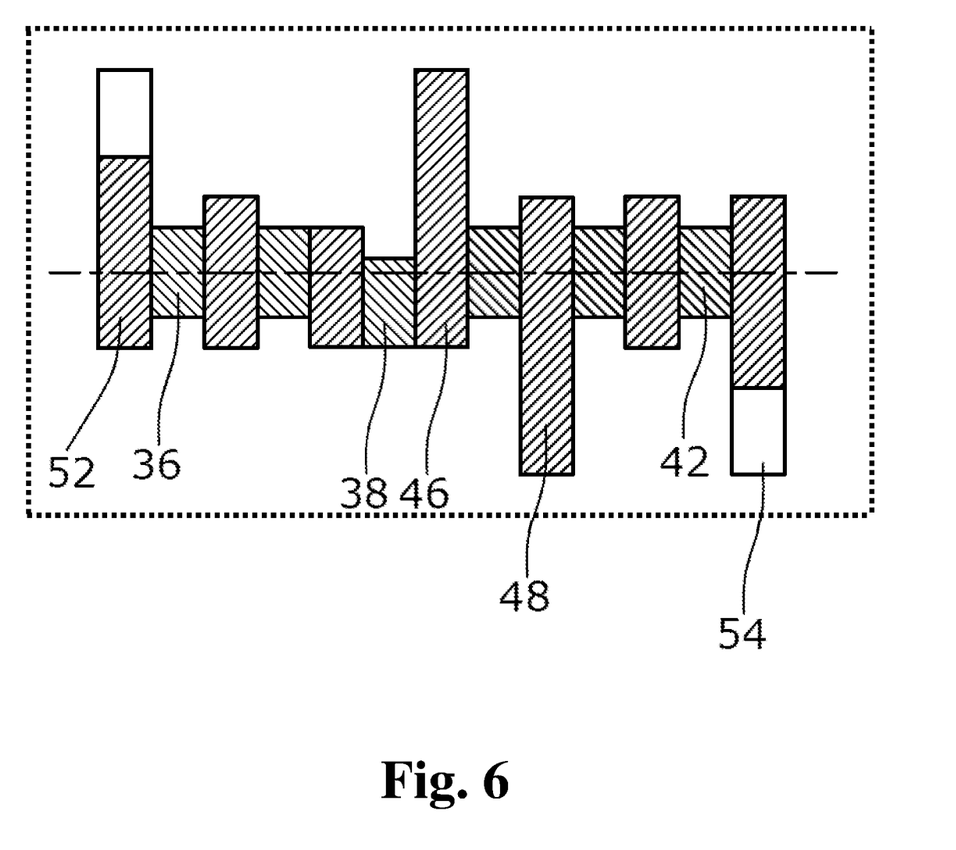
FIG. 6 shows a view of the cross-section indicated as a dotted line in FIG. 2.

The present invention provides that an asymmetrical distance exists between the crank throws. This becomes particularly clear from the perspective view in FIG. 2, the schematic illustration of the crank spider in FIG. 3, and the cross-section of FIG. 2 which is shown in FIG. 6. In the shown embodiment, the crank throws 36, 38, 40, 42 are arranged so that the crank throw 36 is offset with respect to the crank throw 38 by an angle α=120°. The crank throw 38 is also offset with respect to the crank throw 40 by an angle β=120°. The crank throw 40 also includes an angle of γ=120° with the crank throw 42 so that the crank throws 36 and 42 are arranged in angular coincidence relative to one another. The ignition sequence in the cylinders 20, 22, 24, 26, be it by self-ignition in a Diesel engine or by an ignition spark in a gasoline engine, is in accordance with the crank throws 36, 38, 40, 42. This approach allows the operation of a classic four-cylinder engine as a three-cylinder engine with respect to the ignition sequence and the resultant outlet valve control times. This offers considerable advantages with regard to limiting the emissions and the consumption of such an engine as was explained above.

Figure 2:
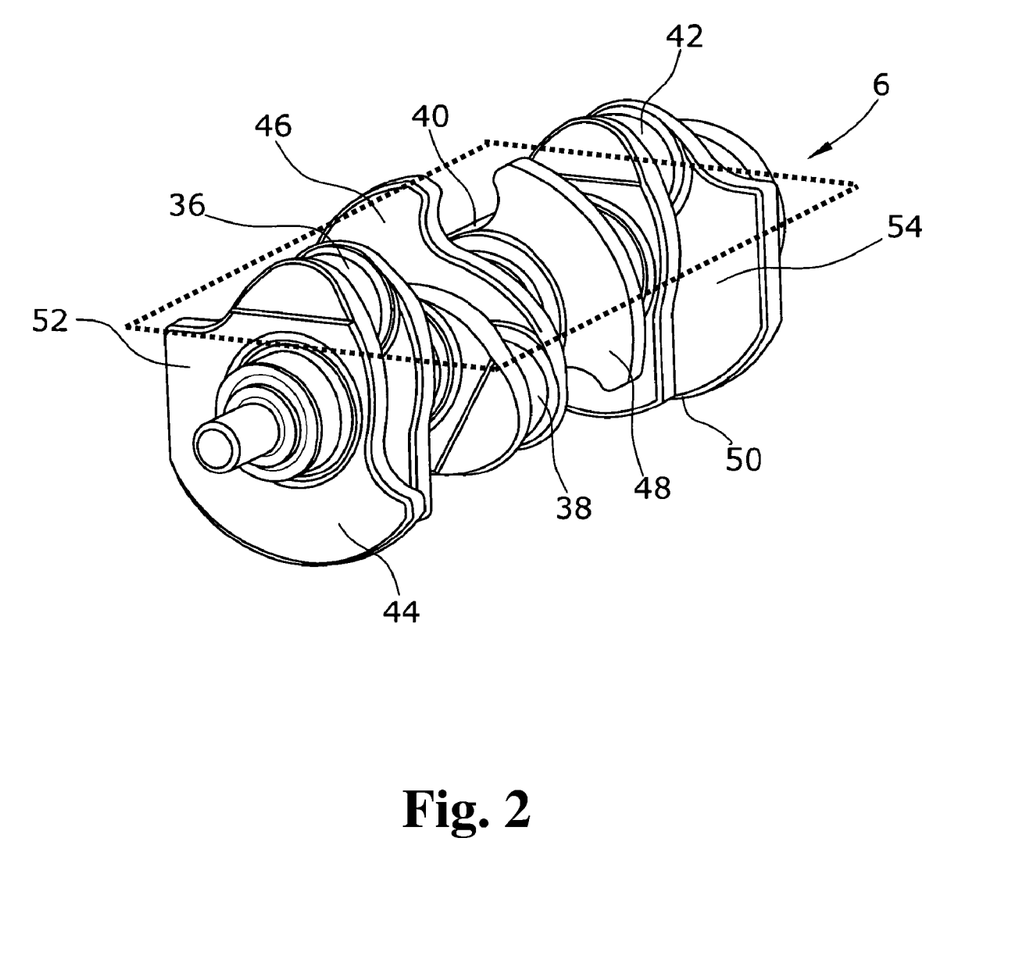
FIG. 2 shows a perspective view of an embodiment of the crankshaft of the present invention shown in FIG. 1.

FIG. 2 further clearly shows counter-weight elements 44, 46, 48, 50 associated to the crank throws 36, 38, 40, 42 in a manner known per se. To provide an optimal vibration behavior of a crankshaft 6 designed according to the present invention, additional weights 52, 54 are provided on the first crank throw 36 and the fourth crank throw 42 in particular to reduce the mass moments of the first order. The additional weight 52 of the first crank throw 36 and the additional weight 54 of the fourth (and last) crank throw 42 are thereby arranged in a mirrored manner, offset with respect to each other, as seen in an axial direction of the crankshaft 6, as is shown in FIG. 6, which shows the cross-section indicated by the dotted lines in FIG. 2. This arrangement makes it possible to use the crankshaft 6 of the present invention in a conventional internal combustion engine without having to provide reinforcements or special fastening measure with respect to the cylinder housing 28.

Figure 4:
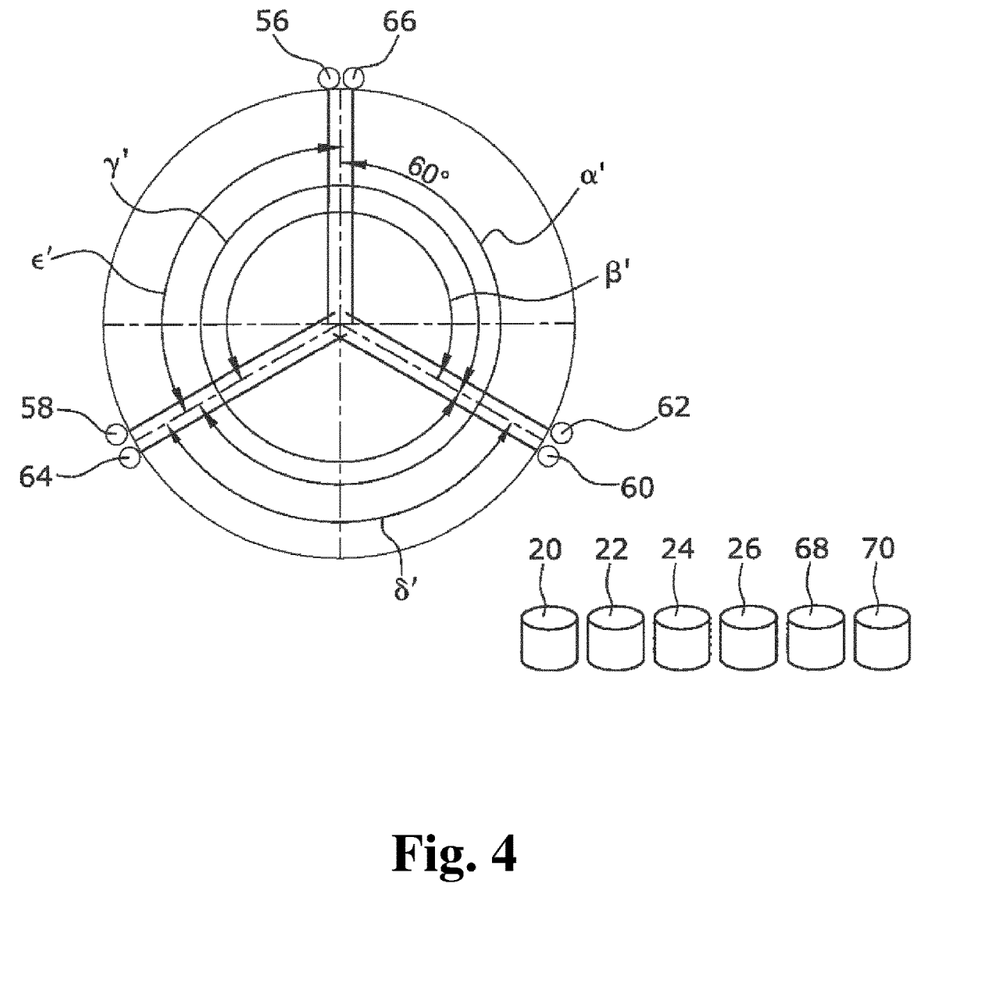
FIG. 4 shows a schematic view of a crank spider of a first embodiment of a crankshaft according to the present invention in a six-cylinder configuration with a cylinder arrangement schematically illustrated.

FIG. 4 is a schematic view of a crank spider of a first embodiment of a crankshaft 6 according to the present invention in a six-cylinder configuration. In this case, six crank throws 56, 58, 60, 62, 64 and 66 are provided which are associated to corresponding cylinders 20, 22, 24, 26, 68, 70. The first and second crank throws 56, 58 are offset with respect to each other by an angle α'=approximately 240°. The second and third crank throws 58, 60 are offset with respect to each other by an angle β'=approximately 240°, the third and fourth crank throws 60, 62 are offset with respect to each other by an angle γ'=approximately 360°, the fourth and fifth crank throws 62, 64 are offset with respect to each other by an angle δ'=approximately 120°, while the fifth and sixth crank throws 64, 66 are offset with respect to each other by an angle ε'=approximately 120°. Such an internal combustion engine may of course be operated in a classic manner as a six-cylinder engine with the ignition sequence of the cylinders being 20-22-26-70-68-24. Depending on the load condition, it may, however, also be operated in a five-cylinder ignition sequence (20 and/or 70)-22-26-68-24. It is thus possible to adopt the classical crankshaft 6 of a six-cylinder internal combustion engine without any modification, with the mass balance and the free mass moments remaining on a zero level even when the cylinders are deactivated. A simultaneous ignition of cylinders 20 and 70 does not put a higher load, e.g., on the cylinder head screws of a cylinder head. However, due to the omission of the ignition sequence in the sixth cylinder of the classical sequence, no regular ignition sequence is provided.

Figure 5:
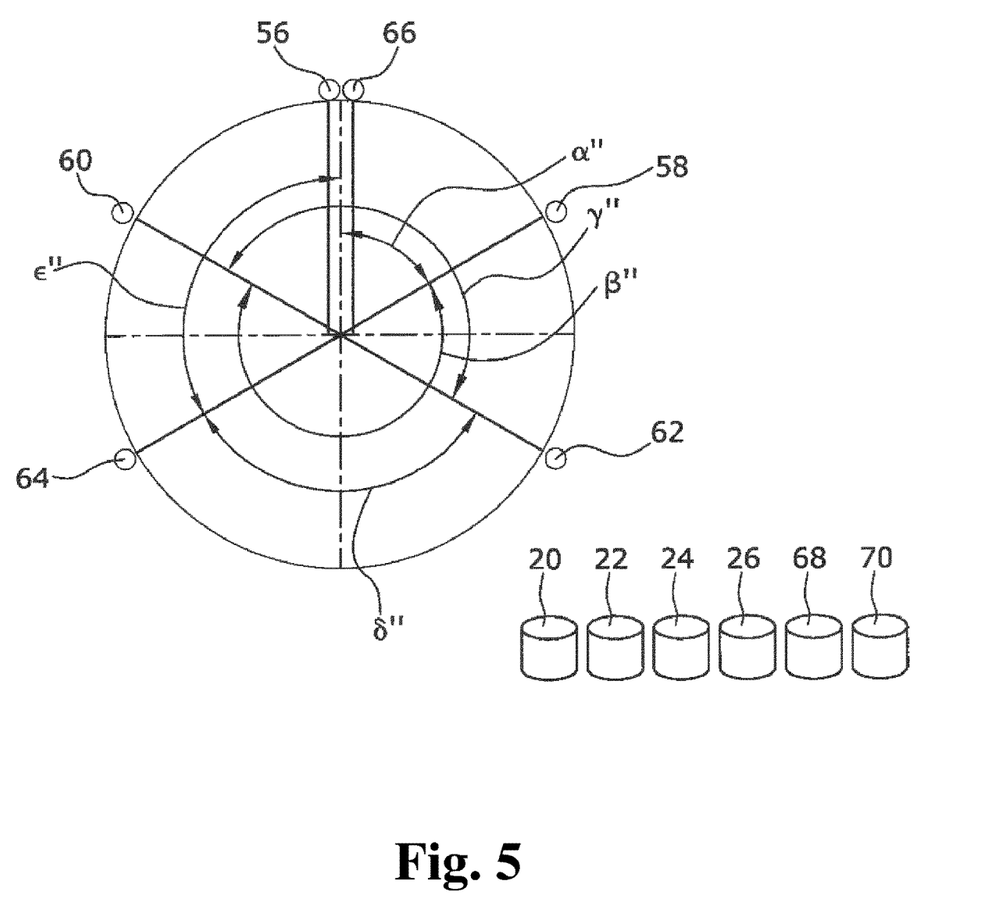
FIG. 5 shows a schematic view of a crank spider of a second embodiment of a crankshaft according to the present invention in a six-cylinder configuration with a cylinder arrangement schematically illustrated.

Such a regular ignition sequence can be achieved with a second embodiment of a crankshaft 6 of the present invention in a six-cylinder configuration as shown by the crank spider illustrated in FIG. 5. Six crank throws 56, 58, 60, 62, 64 and 66 are here provided which are associated to corresponding cylinders 20, 22, 24, 26, 68, 70. The first and second crank throws 56, 58 are offset with respect to each other by an angle α"=approximately 60°. The second and third crank throws 58, 60 are offset with respect to each other by an angle β"=approximately 240°, the third and fourth crank throws 60, 62 are offset with respect to each other by an angle γ"=approximately 180°, the fourth and fifth crank throws 62, 64 are offset with respect to each other by an angle δ"=approximately 120°, while the fifth and sixth crank throws 64, 66 are offset with respect to each other by an angle ε"=approximately 120°. In this case, the classic ignition sequence is also 20-22-26-70-68-24 for a six-cylinder engine and (20 and/or 70)-22-26-68-24 for a five-cylinder engine.

A cylinder deactivation may be realized in a particularly simple manner by a variable valve device. In order to provide for a cylinder deactivation of the cylinder (20, 26; 20, 70) in the low load ranges, which cylinder is operatively connected to the first or the last crank throw (36, 42; 56, 66), the variable valve device may have an eccentric member which in at least one position causes a zero stroke of at least the inlet valves of the cylinder 20, 26; 20, 70 to be deactivated.

The present invention is not limited to embodiments described herein; reference should be had to the appended claims.

What is claimed is:

1. A crankshaft for an in-line internal combustion engine, the crankshaft comprising:
at least two bearing points; and
a plurality of crank throws comprising a first crank throw and a last crank throw, each of the plurality of crank throws comprising a counter-weight element, the first crank throw and the last crank throw each additionally comprising an additional weight,
wherein,
the plurality of crank throws are arranged angularly offset with respect to each other so that at least two of the plurality of crank throws are arranged in angular coincidence with each other,
the plurality of crank throws and their respective counter-weight elements are arranged to provide for a mass balance,
the first crank throw and the last crank throw, as seen in an axial direction of the crankshaft, are arranged in angular coincidence with each other, and
when viewed along the axial direction of the crankshaft onto the first crank throw, the additional weight of the first crank throw and the additional weight of the last crank throw are arranged in a mirrored manner with no overlapping parts.

2. The crankshaft as recited in claim 1, wherein,
the plurality of crank throws further comprises a second crank throw, a third crank throw, and a fourth crank throw as the last crank throw,
the first crank throw and the second crank throw are arranged so as to be offset with respect to each other by an angle of substantially 120°,
the second crank throw and the third crank throw are arranged so as to be offset with respect to each other by an angle of substantially 120°, and
the third crank throw and the fourth crank throw are arranged so as to be offset with respect to each other by an angle of substantially 120°.

3. The crankshaft as recited in claim 1, wherein,
the plurality of crank throws further comprises a second crank throw, a third crank throw, a fourth crank throw, a fifth crank throw, and a sixth crank throw as the last crank throw,
the first crank throw and the second crank throw are arranged so as to be offset with respect to each other by an angle of substantially 240°,
the second crank throw and the third crank throw are arranged so as to be offset with respect to each other by an angle of substantially 240°,
the third crank throw and the fourth crank throw are arranged so as to be offset with respect to each other by an angle of substantially 360°,
the fourth crank throw and the fifth crank throw are arranged so as to be offset with respect to each other by an angle of substantially 120°, and
the fifth crank throw and the sixth crank throw are arranged so as to be offset with respect to each other by an angle of substantially 120°.

4. The crankshaft as recited in claim 1, wherein,
the plurality of crank throws further comprises a second crank throw, a third crank throw, a fourth crank throw, a fifth crank throw, and a sixth crank throw as the last crank throw,
the first crank throw and the second crank throw are arranged so as to be offset with respect to each other by an angle of substantially 60°,
the second crank throw and the third crank throw are arranged so as to be offset with respect to each other by an angle of substantially 240°,
the third crank throw and the fourth crank throw are arranged so as to be offset with respect to each other by an angle of substantially 180°,
the fourth crank throw and the fifth crank throw are arranged so as to be offset with respect to each other by an angle of substantially 120°, and
the fifth crank throw and the sixth crank throw are arranged so as to be offset with respect to each other by an angle of substantially 120°.

5. An in-line internal combustion engine arranged in a four-cylinder configuration comprising:
a crankcase;

the crankshaft as recited in claim 2 arranged within the crankcase;
a cylinder housing comprising a plurality of cylinders which comprises a first cylinder, a second cylinder, a third cylinder and a fourth cylinder;
a cylinder head connected to the cylinder housing;
at least one inlet valve and at least one outlet valve arranged in the cylinder head;
at least one first camshaft assigned to the at least one inlet valve; and
and at least one second camshaft assigned to the at least one outlet valve,
wherein,
an ignition sequence of the plurality of cylinders is in an order of the first cylinder, the second cylinder, the third cylinder, and the fourth cylinder.

6. The in-line internal combustion engine as recited in claim 5, further comprising:
a variable valve driving device arranged in the cylinder head.

7. The in-line internal combustion engine as recited in claim 6, wherein,
the first cylinder is operatively connected with the first crank throw,
the fourth cylinder is operatively connected with the last crank throw, and
in a lower load range, the in-line internal combustion engine is configured to provide for a deactivation of the first cylinder which is operatively connected with the first crank throw or of the fourth cylinder which is operatively connected with the last crank throw.

8. The in-line internal combustion engine as recited in claim 7, wherein,
the variable valve driving device comprises an eccentric member, and
the eccentric member is configured so that, in at least one position, the eccentric member causes a zero stroke of the at least one inlet valve of the first cylinder or the fourth cylinder to be deactivated.

9. An in-line internal combustion engine arranged in a six-cylinder configuration comprising:
a crankcase;
the crankshaft as recited in claim 3 arranged within the crankcase;
a cylinder housing comprising a plurality of cylinders which comprises a first cylinder, a second cylinder, a third cylinder, a fourth cylinder, a fifth cylinder, and a sixth cylinder;
a cylinder head connected to the cylinder housing;
at least one inlet valve and at least one outlet valve arranged in the cylinder head;
at least one first camshaft assigned to the at least one inlet valve; and
and at least one second camshaft assigned to the at least one outlet valve,
wherein,
an ignition sequence of the plurality of cylinders is in an order of the first cylinder, the second cylinder, the fourth cylinder, the sixth cylinder, the fifth cylinder, and the third cylinder.

10. The in-line internal combustion engine as recited in claim 9, further comprising:
a variable valve driving device arranged in the cylinder head.

11. The in-line internal combustion engine as recited in claim 10, wherein,
the first cylinder is operatively connected with the first crank throw,
the sixth cylinder is operatively connected with the last crank throw, and
in a lower load range, the in-line internal combustion engine is configured to provide for a deactivation of the first cylinder which is operatively connected with the first crank throw or of the sixth cylinder which is operatively connected with the last crank throw.

12. The in-line internal combustion engine as recited in claim 7, wherein,
the variable valve driving device comprises an eccentric member, and
the eccentric member is configured so that, in at least one position, the eccentric member causes a zero stroke of the at least one inlet valve of the first cylinder or a sixth cylinder to be deactivated.

* * * * *